June 26, 1951 — G. J. WINSLOW — 2,558,328

MOUNTING DEVICE

Filed March 13, 1950

Inventor
George J. Winslow
By Willits, Helmig & Gaillio
Attorneys

Patented June 26, 1951

2,558,328

UNITED STATES PATENT OFFICE 2,558,328

MOUNTING DEVICE

George J. Winslow, Detroit, Mich., assignor to General Motors Corporation, Detroit, Mich., a corporation of Delaware Application March 13, 1950, Serial No. 149,396

5 Claims. (Cl. 248—205)

This invention relates to a mounting device and is particularly applicable to a mounting construction for securing accessories such as outside rear view mirrors to motor vehicle bodies.

A principal object of this invention is to provide a mounting device which is of simple and sturdy construction and which permits automobile accessories, such as outside rear vision mirrors or the like, to be easily and quickly mounted. The invention features a construction permitting such ease of mounting by providing for attachment from the accessory side of the supporting body or panel when only one end of the lever included in the device is accessible from the opposite side of the body or panel. This construction further prevents theft of such items as outside rear view mirrors mounted on door panels by a construction which makes it virtually impossible to remove such mirrors from the outside of vehicles when the doors are locked.

Furthermore, the invention provides a mounting having a very trim appearance after assembly due to the connecting means being completely concealed from view. The mounting assembly in a more specific form comprises a clamping lever rotatably secured intermediate its ends to a mountable bracket and having one end provided with a hook adapted to be inserted in an aperture in a supporting body and clamped thereto, the other end of the lever provided with screw means engageable with the supporting body.

Other objects and advantages of the invention will more fully appear from the following description of the preferred embodiment of the invention shown in the accompanying drawing, in which.

Figure 1:
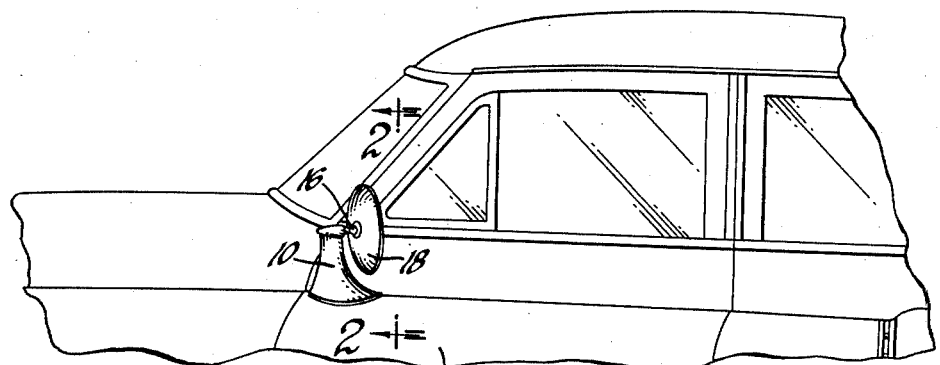
Figure 1 is a side view of an automobile provided with an outside rear view mirror and mounting assembly embodying the invention.
Figure 2:
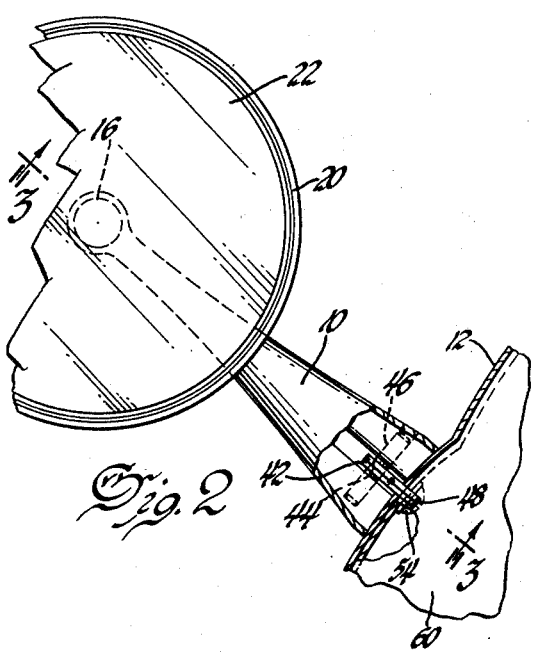
Figure 2 is an enlarged fragmentary elevational view, along the line 2—2 of Figure 1, of the mirror and mounting device, showing a portion of the bracket base broken away and in section.

Referring to the drawing, the motor vehicle shown in Figure 1 has the outside rear view mirror assembly embodying the invention mounted upon the outside panel of the left front door. This mirror assembly, shown in detail in Figures 2, 3 and 4, has a mirror bracket 10 secured to the supporting panel 12.

A ball-ended stud 14 is shown as pressed securely into the mirror end of the bracket 10, the ball 16 being enclosed by the flanged inner edge 17 of the mirror casing 18. This casing has its outer edge 20 spun to overlap the chamfered periphery of the circular mirror 22, thereby securing the mirror to the casing. A circular gasket 24 having the same diameter as mirror 22 is positioned against the inner face of the mirror to provide a cushioned seat therefor. An annular stiffener 26 has its outer periphery provided with a flange 25 which projects against the gasket to hold the gasket and the mirror in assembled position. The inner edge of the stiffener 26 is provided with a flange 28 having a concave surface engaging the ball 16. A circular flat spring 30, having a cup-shaped indentation in its central portion to resiliently seat the ball 16, is shown as secured to the stiffener 26 with rivets 32. This construction permits the mirror to be tilted in all directions, as indicated by the broken lines in Figure 3, to provide the necessary adjustability.

Figure 4:
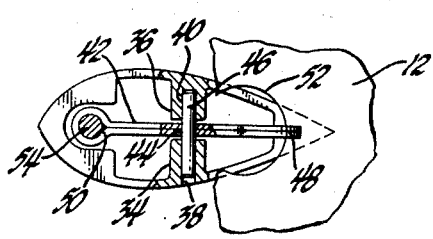
Figure 4 is a fragmentary sectional bottom plan view of the mirror mounting along the line 4—4 of Figure 3.

The bracket 10 has the opposite walls of its hollow lower portion provided with inwardly directed bosses 34 and 36. The boss 34 has a hole 38 throughout its thickness, while the boss 36 has a hole or recess 40 coaxial with the hole 38 and opening into the interior of the bracket. A clamping lever 42, shown as formed by folding a strip back upon itself, is provided near its midpoint with a transverse circular aperture 44. This arrangement, which is best shown in Figure 4, permits the insertion of a shaft or pin 46 transversely through the hole 38 in the boss 34, through the circular aperture 44 in lever 42, and into the hole 40 in the boss 36, thereby pivotally mounting the clamping lever on the pin. The end of the pin is positioned against the end wall of the hole 40, and the pin may be secured in the holes 38 and 40 by a press fit.

The clamping lever 42 has one end shaped to form a retaining hook 48 and the other end provided with means whereby the hooked end may be forced downwardly toward the supporting body or panel. This means is shown as including a threaded opening 50, which is formed by the reflex fold, the opening being approximately perpendicular to the supporting surface when the lever is in the assembled position.

Figure 3:
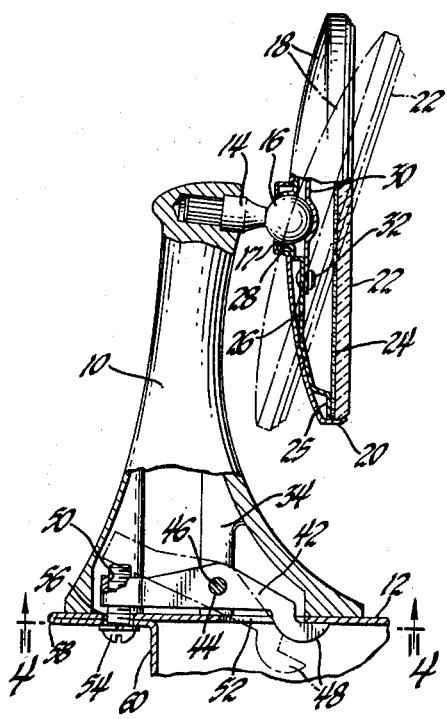
Figure 3 is an elevational view of the mirror and mounting device substantially along the line 3—3 of Figure 2, with parts broken away and in section, showing the unassembled and assembled positions of the clamping mechanism.

Mounting the bracket is accomplished by pivoting the clamping lever 42 about the pin 46 to a position indicated by the broken lines in Figure 3, and inserting the retaining hook 48 through the aperture 52 in the supporting body 12 so as to engage the inner surface thereof. To lock the bracket securely to the support, the arm is pivoted to the position shown by the solid lines in Figure 3. A screw 54 is then inserted through the small aperture 56 in the supporting body and threaded into the hole 50 in the clamping lever. As the screw is tightened, the hooked end of the lever is forced against the inner surface of the supporting body, firmly clamping the bracket against the outer surface of the support.

As shown in Figure 3, the construction of this mounting device permits ready mounting of the bracket 10 on such supporting bodies as the door of an automotive vehicle. The flange portion 58 of the outer panel 12 of the door projects forward of the transverse forward end wall 60, permitting the screw 54 to be inserted through aperture 56 from the inner side of the vehicle door when the door is opened. It therefore is possible to drill the two holes 52 and 56 from the outer side of the door panel and to easily mount the bracket without necessitating dismantling the door.

While the described embodiment of the present invention constitutes a preferred form, it is to be understood that other forms might be adopted, all coming within the scope of the following claims.

I claim:

1. A mounting device comprising, in combination with a member to be mounted, a lever pivotally supported in said member, one end of said lever formed to project through an aperture in a supporting body and engage the inner surface thereof, and means associated with the other end of said lever adapted to secure said other end to the supporting body and, by rotation of the lever, to force said first mentioned end against said inner surface.

2. A mounting device comprising, in combination with a member to be mounted, a lever pivotally supported intermediate its ends in said member, one end of said lever formed to project through an aperture in a supporting body and engage the inner surface thereof, and screw means associated with the other end of said lever and adapted to connect said end to the supporting body and, by rotation of said lever, to clamp said first end to said body.

3. The combination of a supporting body and a bracket to be mounted thereon, said bracket provided with a hollow base and a lever pivotally mounted intermediate its ends in said base, one end of said lever extending through an aperture in said body and engaging the inner surface thereof, and means connecting the other end of the lever to said body and adapted to secure said end to the body and to rotate the lever to thereby clamp the lever to the inner surface of said body.

4. The combination with a supporting member having an aperture therein of a mountable assembly comprising a bracket having a hollow base portion positioned against the outer surface of said supporting member, a pin positioned within said base and having its ends secured thereto, a clamping lever mounted intermediate its ends on said pin for limited rotation thereon, said lever having one end projecting through said aperture, and screw means associated with the other end of said lever to secure said other end to the supporting member for pivotally clamping the first end of said lever against the inner surface of the supporting member for securing the bracket thereto.

5. A mounting construction comprising a mountable bracket having a hollow base, a pin within said base with its ends secured thereto, and a clamping lever pivotally mounted on the pin, one end of said lever provided with a retaining hook adapted to project through an aperture in a supporting member to engage the inner surface thereof, the other end provided with screw means adapted to secure said second end to the supporting member and, by rotation of the lever, to clamp the hook against the inner surface of the supporting member for securing the bracket thereto.

GEORGE J. WINSLOW.

No references cited.